United States Patent [19]

Brusasco

[11] Patent Number: 5,062,240

[45] Date of Patent: Nov. 5, 1991

[54] VEHICLE DOOR

[75] Inventor: Enzo Brusasco, Turin, Italy

[73] Assignee: Roltra, Morse S.p.A., Vica-Rivoli, Italy

[21] Appl. No.: 609,768

[22] Filed: Nov. 7, 1990

[30] Foreign Application Priority Data

Nov. 9, 1989 [IT] Italy ............................... 67984 A/89

[51] Int. Cl.⁵ ........................... E05F 11/48; B60J 5/04
[52] U.S. Cl. ...................................... 49/348; 49/352; 49/502; 296/153
[58] Field of Search ................. 49/348, 349, 350, 351, 49/352, 353, 502; 296/146, 153, 39.1

[56] References Cited

U.S. PATENT DOCUMENTS

| 4,592,245 | 6/1986 | Pickles | 49/352 X |
| 4,648,208 | 3/1987 | Baldamus et al. | 49/502 |
| 4,766,697 | 8/1988 | Boileau | 49/348 X |
| 4,785,585 | 11/1988 | Grier et al. | 49/502 |
| 4,934,099 | 6/1990 | Maekawa et al. | 49/502 X |
| 4,949,508 | 8/1990 | Elton | 49/502 |

Primary Examiner—Philip C. Kannan
Attorney, Agent, or Firm—Shlesinger, Arkwright & Garvey

[57] ABSTRACT

A vehicle door having a lower portion and consisting of a box body defined by an inner sheet and an outer sheet connected peripherally to each other; the inner sheet having an upper opening closed by a self-supporting, preferably metal frame, the surface of which facing the outer sheet is fitted integral with door locking mechanisms and regulating and guide mechanisms for a sliding window, and the opposite surface of which is fitted with an interior door finish panel; a further interior finish panel being connected to a lower portion of the inner sheet.

7 Claims, 5 Drawing Sheets

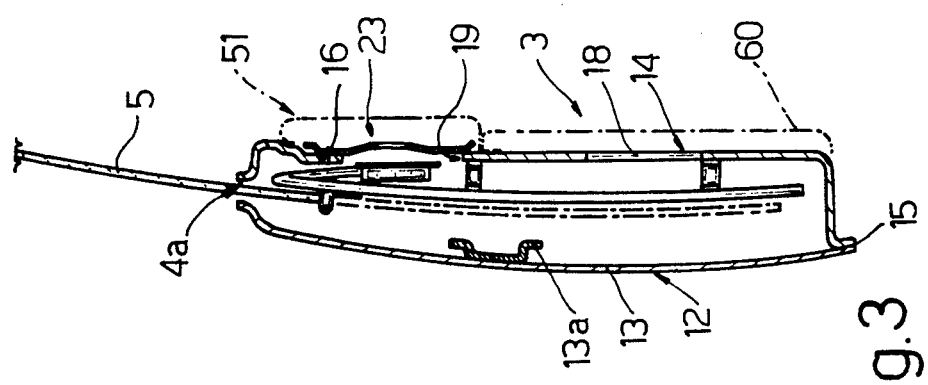
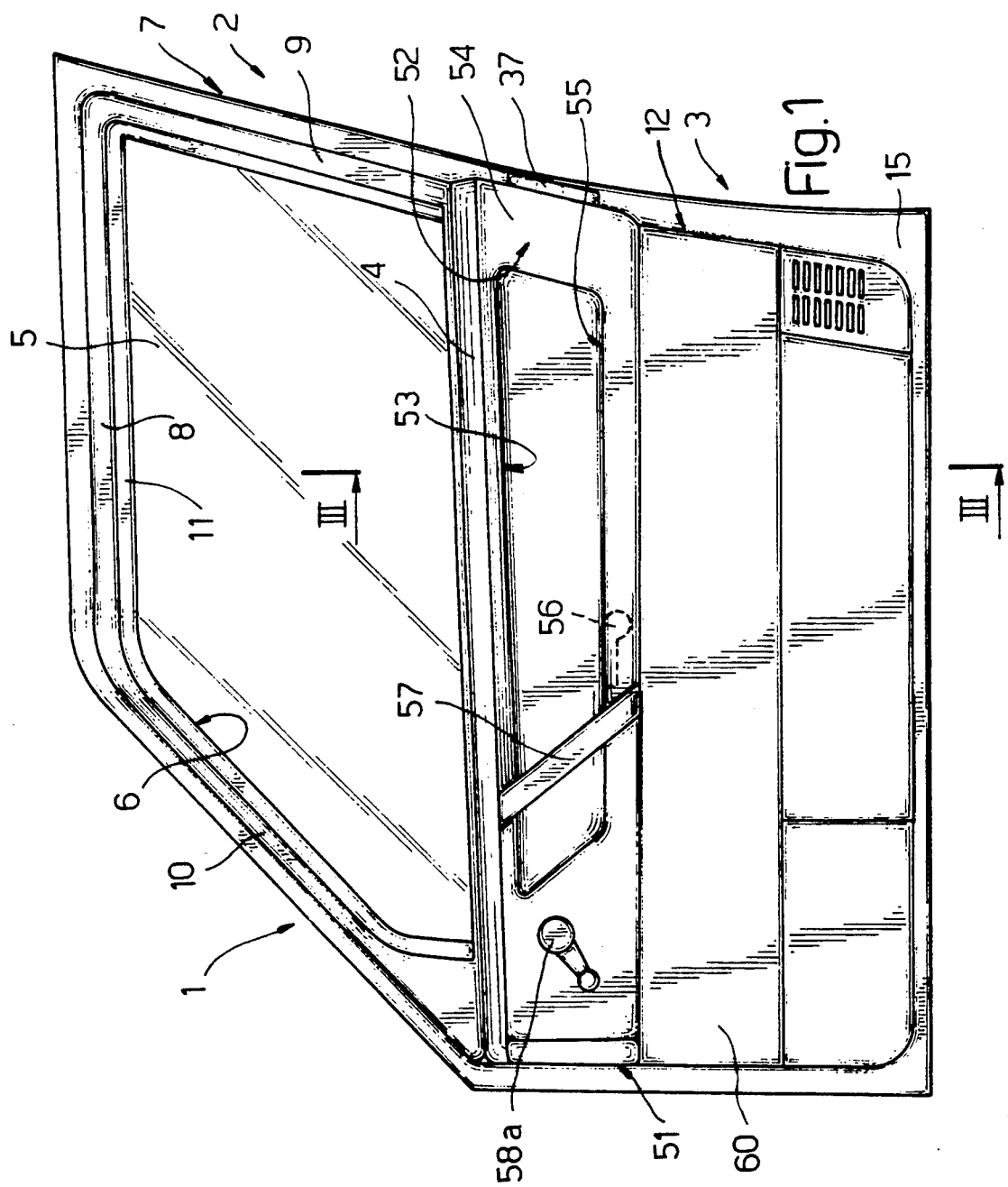

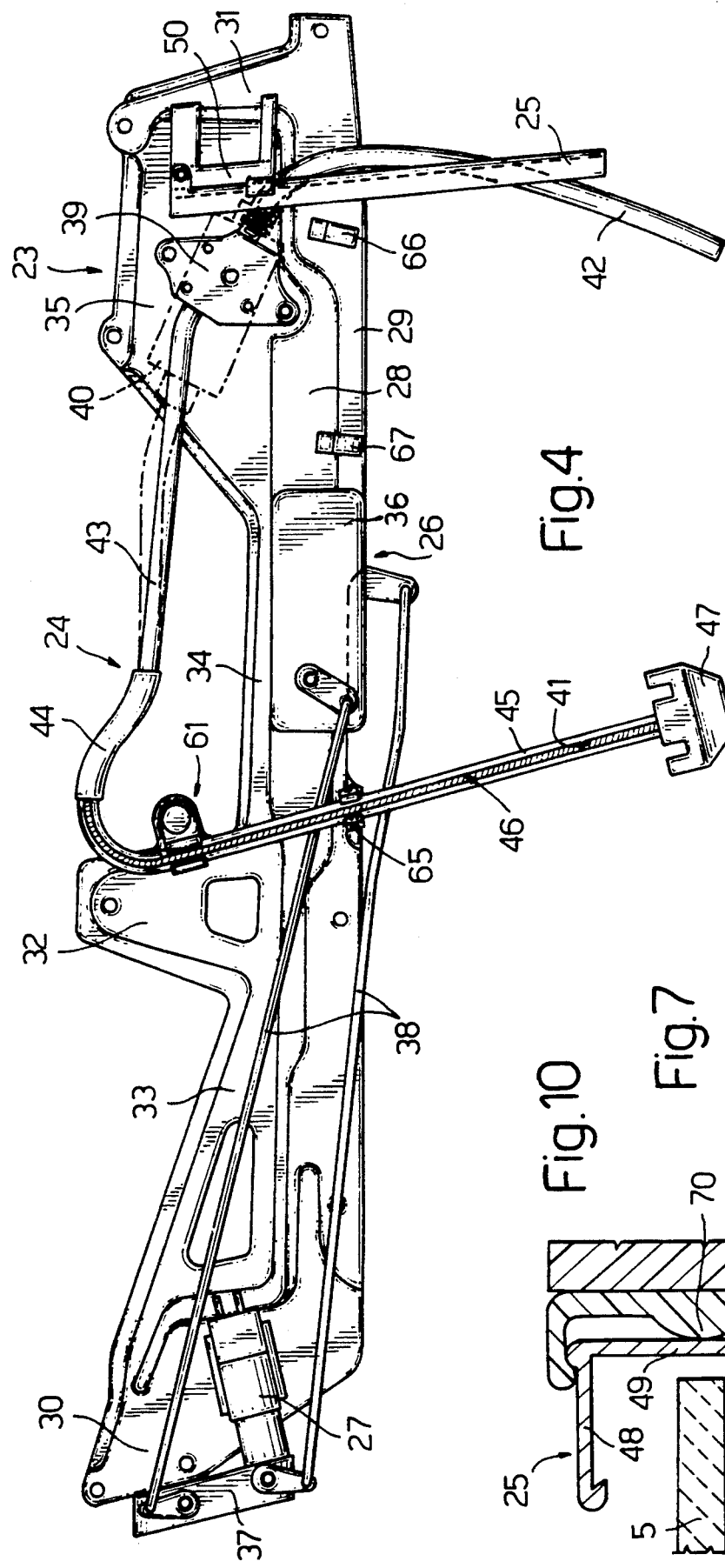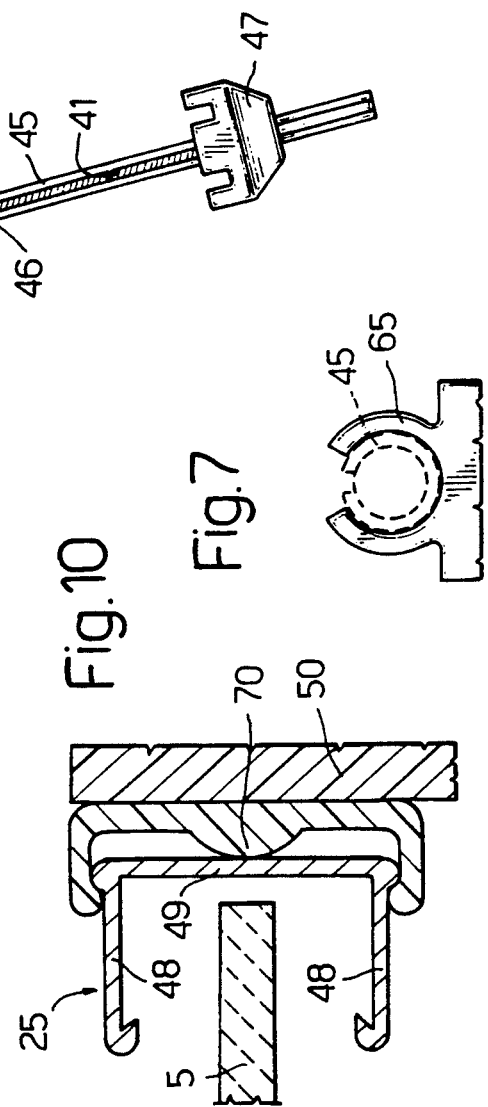

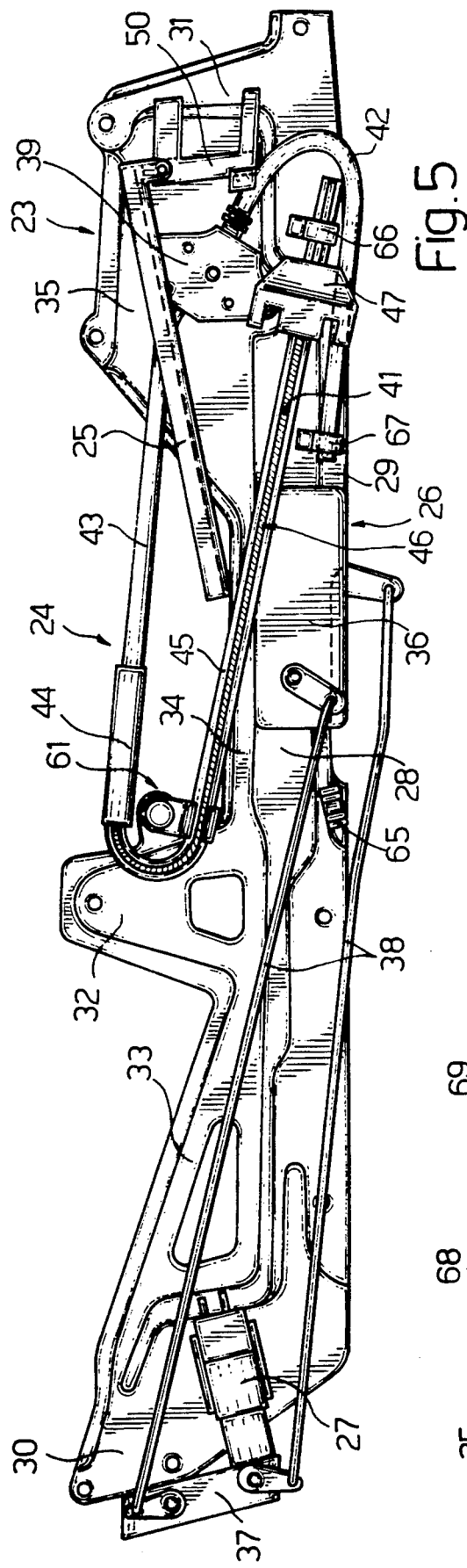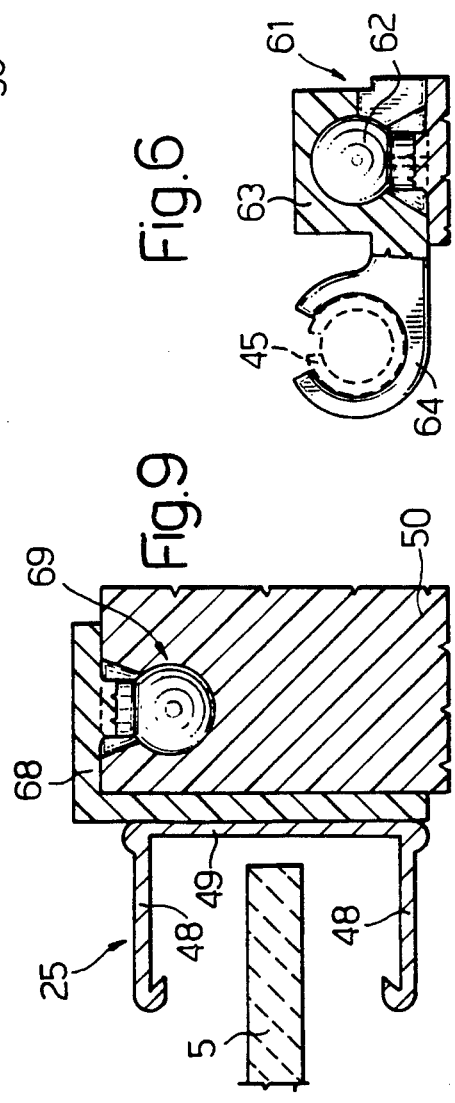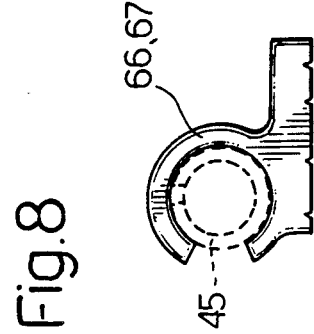

VEHICLE DOOR

BACKGROUND OF THE INVENTION

The present invention relates to a vehicle door. Vehicles are known to be fitted with doors comprising an inner and outer metal sheet clinched and welded together to form a frame, the upper portion of which defines a window frame fitted with a window mounted in siding manned between the two sheets, and the lower portion of which defines a frame for a box comprising an inner and outer panel integral with the frame. The outer panel constitutes the lower portion of the outer sheet and defines the outside of the door, while the inner panel constitutes the lower portion of the inner sheet and presents a number of holes enabling insertion, inside the box, of all the functional components on the door (locks, window regulators, etc.) which are connected to the inner panel itself. Once the functional components are assembled, the inner panel is fitted with a finish panel, usually of synthetic material, the inner surface of which usually incorporates finish elements, such as armrests, handles, etc.

In recent times, mainly for the purpose of speeding up on-line assembly, testing and setup, the inner panel, which was formerly an integral part of the door structure, has been replaced by a preassembled panel connected by means of screws or similar removable fasteners, and fitted with the window regulating and guide devices and the door locking devices.

The load-bearing structure of the lower portion of a door of the aforementioned type therefore consists merely of an outer sheet and an inner sheet clinched and welded peripherally to the outer sheet and having an opening substantially extending over the entire lower portion of the door. On such a door, the opening formed in the inner sheet is partially closed by the preassembled panel connected to the inner panel, while the inner contour of the door is again defined by the finish panel, which is usually formed in two parts and incorporates said armrests and handles.

Though satisfactory in many respects, known doors of the aforementioned type present a number of drawbacks both technically and economically. In fact, substantially total removal of the lower portion of the inner sheet for assembling the preassembled panel seriously reduces the torsional resistance of the load-bearing structure, with the result that high-cost automatic handling equipment must be provided at the automatic assembly and welding stages.

SUMMARY OF THE INVENTION

The aim of the present invention is to provide a vehicle door designed to overcome the above drawbacks. With this aim in view, according to the present invention, there is provided a vehicle door having an upper window opening fitted with a sliding window, and comprising, at the bottom, a box body defined by an inner sheet and an outer sheet connected peripherally to each other; characterized by the face that said inner sheet presents an opening extending over a relatively small upper portion of the same; a self-supporting frame being connected in removable manner to said inner sheet for closing said opening; a first finish panel being connected to said inner sheet for covering said frame; a second finish panel being provided outside said box body for covering said inner sheet; and door locking and means and window regulating and guide means being connected to said frame.

Thus, on the above door, only a relatively small portion of the inner sheet is removed for assembling the self-supporting frame, so that the lower portion of the door presents a substantially shell type structure having a relatively high torsional strength.

On the above door, said window regulating and guide means preferably comprise respective portions arranged, in use, in respective operating positions wherein said portions project below the lower edge of said opening; each said portion being connected to said frame so as to move, in relation to said frame, between said projecting operating position and an assembly position wherein said portion is withdrawn and housed entirely within the perimeter of said opening.

The advantage of the above design characteristic is that it enables said frame to be assembled and connected automatically to said box body.

BRIEF DESCRIPTION OF THE DRAWINGS

A non-limiting embodiment of the present invention will be described by way of example with reference to the accompanying drawings, in which:

FIG. 1 shows a side view, from the inside, of a preferred embodiment of the door according to the present invention;

FIG. 3 shows a section along line III—III in FIG. 1;

FIG. 4 shows a larger-scale view of a detail in FIG. 2;

FIG. 5 shows the same view as in FIG. 4, but with certain parts in a different operating position;

FIG. 6 shows a larger-scale section of a first detail in FIG. 5;

FIG. 7 shows a larger-scale section of a second detail in FIG.5;

FIG. 8 shows a larger-scale section of a third detail in FIG. 5;

FIG. 9 shows a larger-scale section of a fourth detail in FIG. 5;

FIG. 10 shows a larger-scale section of a fourth detail in FIG. 5;

DETAILED DESCRIPTION OF THE INVENTION

Figure 2:
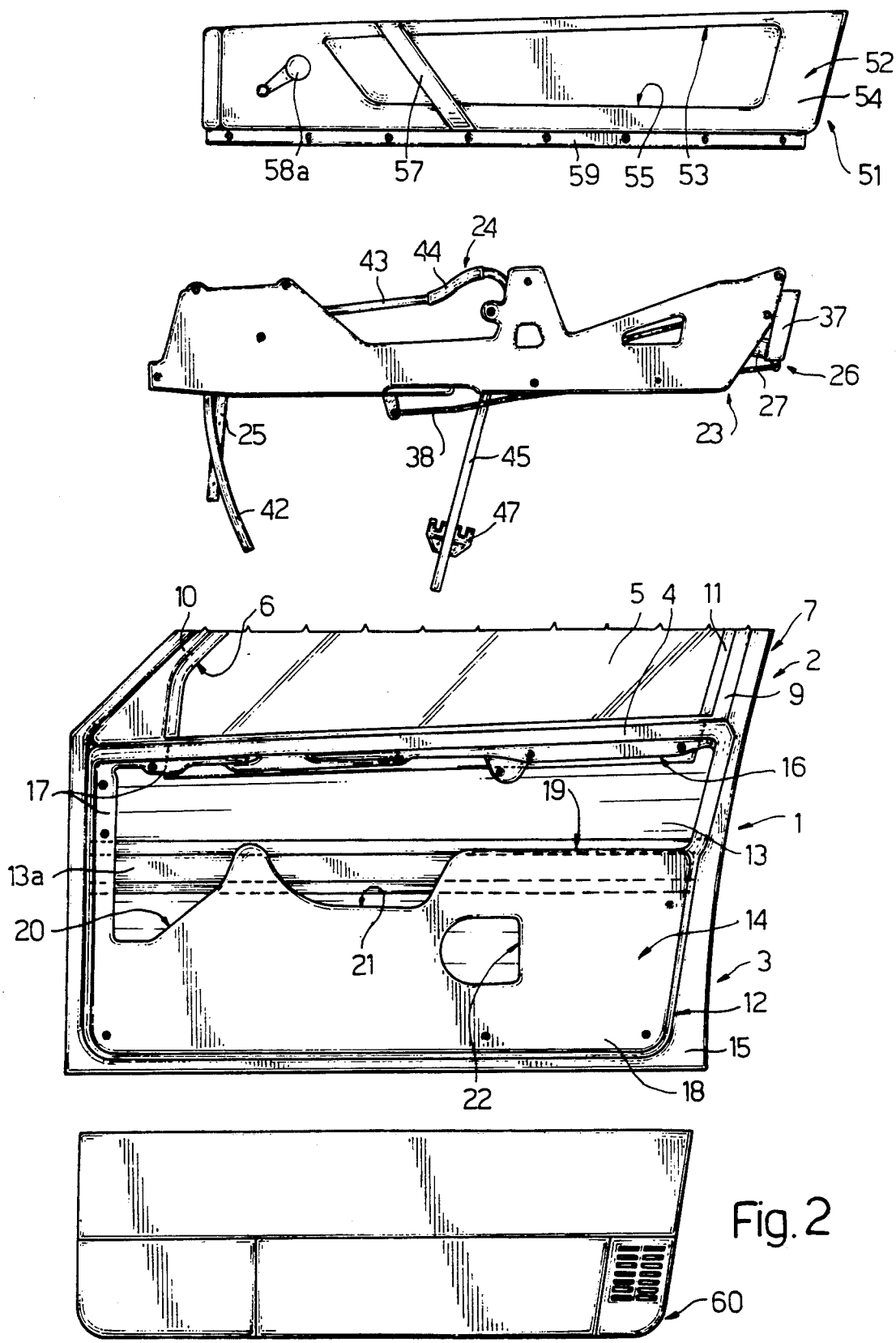
FIG. 2 shows an exploded view of part of the FIG. 1 door.

Number 1 in FIGS. 1 and 2 indicates a vehicle door comprising an upper portion 2 and a lower portion 3 separated by a substantially horizontal cross member 4 having a longitudinal opening 4a in which is fitted a sliding window 5.

Upper portion 2 presents an opening 6 surrounded by a substantially U-shaped frame 7 having its concave side facing downwards towards cross member 4 with which the bottom end of frame 7 is integral. Frame 7 comprises an upper cross member 8 substantially parallel to cross member 4 and connected to the rear end of the same by a first substantially vertical post 9, and to the front end of cross member 4 by a second inclined post 10. The inner edge of posts 9 and 10 and cross member 8 is fitted with a channel 11 for housing and guiding window 5.

As shown in FIG. 2, lower portion 3 of door 1 consists of a box body 12 defined by a convex outer sheet 13 and a convex inner sheet 14, the side and bottom edges of which are connected to dorm a frame 15, and the top edges of which define cross member 4. Sheet 13 defines the outer contour of the lower portion of door 1, and is fitted on the inside surface with a strengthening section 13a. At the top, just below cross member 4 and inside frame 15, sheet 14 presents a transverse opening 16, the height of which is relatively small as compared with that of the lower portion of door 1, and which is so formed as to defined a peripheral flange 17 extending along its top and front edges. Opening 16 is defined at the bottom by a panel 18 forming part of sheet 14 and substantially coplanar with flange 17. Panel 18 is defined at the top by a substantially straight, horizontal edge 19 having two recesses 20 and 21, and presents a relatively small, substantially central opening 22.

As shown in FIG. 4, opening 16 is closed by a metal frame 23 prefitted, on the side facing sheet 13, with a window regulating device 24, a channel 25 for guiding window 5, a lock device 26 and a door locking device 27. Frame 23 comprises a bottom cross member 28 having a bottom connecting flange 29 and from the front and rear ends and intermediate portion of which there extend upwards a front upright 31, a rear upright 30 and an intermediate upright 32. Intermediate upright 32 blends with rear upright 30 via a substantially triangular sheet metal connecting plate 33, and with front upright 31 via a sheet metal strip 34 extending along the top edge of cross member 28, and a substantially trapezoidal sheet metal connecting plate 35.

Lock device 26 comprises a control box 36 connected integral with frame 23 on the intermediate portion of cross member 28; and a known type of lock 37 fitted to frame 23 on the rear edge of upright 30, and connected to both control box 36, via ties 38, and to door locking device 27, which is connected to frame 23 on connecting plate 33.

Window regulating device 24 comprises a known type of control top 39 supported on frame 23 on the rear portion of connecting plate 35. As shown by the totted line in FIG. 4, box 39 may be replaced by a known box 40 of an electromechanical control device (not shown) comprising an electric motor.

Window regulating device 24 also comprises an actuating member consisting of a precompressed spring 41 fitted through box 39 or 40, and mounded in axially-sliding manner inside a flexible input conduit 42 extending substantially vertically downwards from box 39 or 40, and inside an output conduit 43 extending substantially horizontally towards the end of upright 32. By means of a hose portion 44, the rear end of conduit 43 is connected to the curved top end of a tubular guide 45 supported on upright 32 and extending substantially vertically downwards. Guide 45 presents a longitudinal opening 46 engaged in sliding manner by a connecting element (not shown) connecting the free end of spring 41 to a plate 47 connected to sliding window 5.

Window channel 25 is supported on connecting plate 35 to the front of box 39 or 40, and is positioned substantially vertically with its concave side facing the rear end of frame 23. As shown in FIGS. 9 and 10, channel 25 is substantially U-shaped, and comprises two lateral arms 48 lying in planes substantially parallel to that of connecting plate 35 and connected by a core 49, the upper portion of which extends contacting a supporting rib 50 integral with connecting plate 35 and located to the front of box 39 or 40.

As shown in FIG. 2, on the opposite side to that facing sheet 13, frame 23 is covered by a panel 51 having an interior finish surface 52 for door 1 on the opposite side to that facing frame 23. In particular, the central portion of surface 52 of panel 51 presents a substantially rectangular recessed portion 53 surrounded by a substantially flat frame 54 and defined at the bottom by a shoulder 55 substantially perpendicular to the FIG. 2 plane and having an opening (not shown) for a handle 56 by which to operate lock device 26. On the front portion of recessed portion 53, the shoulder 55 of which acts as an armrest, panel 51 presents a fixed grip handle 57 extending across recessed portion 53 and connected at opposite ends to the upper and lower portions of frame 54. The front portion of frame 54 (FIG. 3) is fitted through with a pin 58 supporting a rotary handle 58a for manually operating window regulating device 24.

Below frame 54, panel 51 presents a flange 59 having a number of holes for connecting panel 51 to the opposite surface of sheet 14 to that facing sheet 13. Further holes (not shown) are formed along the top and side edges of panel 51 for connecting the same to flange 17. As shown in FIG. 2, panel 18 is fitted with a finish panel 60 preferably formed from synthetic material, having a surface finish as required, and the top edge of which covers flange 59.

For automatically fitting frame 23 on to sheet 14, i.e. by means of a robot, channel 25, conduit 42 and guide 45 (which, as shown in FIG. 2, project, in the operating position, below the bottom edge of frame 23) are designed to collapse in relation to frame 23 into an idle or assembly position (FIG. 5) wherein they are located substantially behind frame 23 and, at any rate, within the confines of opening 16, thus enabling frame 23 to be fitted side by side on to sheet 14, i.e. with no movement required of frame 23 in relation to sheet 14 other than a substantially traversing movement perpendicular to the plane of sheet 14.

To achieve this, close to the end connected to hose 44, guide 45 is connected to frame 23 by a spherical snap joint 61 consisting, as shown in FIG. 6, of a spherical head 62 integral with the top end portion of upright 32, and a plate 63 having a spherical seat engaged by head 62 and fitted integral with a flexible fork 64 engaged by guide 45. When in the operating position shown in FIG. 4, guide 45 is prevented from rotating in relation to frame 23 by the intermediate portion of guide 45 frontally engaging a flexible fork 65 (FIG. 7) integral with cross member 28. When in the collapsed idle position shown in FIG. 5, on the other hand, guide 45 is prevented from rotating in relation to frame 23 by the end portion of guide 45 laterally engaging a flexible fork 66 (FIG. 8) integral with connecting plate 35.

The front portion of cross member 28 is also fitted with a further laterally-engaged flexible fork 67 similar to fork 66 and designed to maintain conduit 42 in the collapsed idle position shown in FIG. 5.

As shown in FIG. 9, the top end of channel 25 presents a side plate 68 connected to the top of rib 50 by a spherical friction joint 69.

When assembling frame 23 on to sheet 14, window 5 is maintained in the raised position, wherein the bottom edge of window 5 is located over the top end of channel 25 maintained by friction in the collapsed position shown in FIG. 5.

Once frame 23 is assembled, the operator grips guide 45 through recess 21 and turns it downwards about an axis substantially perpendicular to frame 23, so as to release guide 45 from fork 66 and engage fork 65. The operator then does the same with flexible conduit 42, which is released from fork 67 and allowed to drop down. Window 5 is then lowered manually so as to engage channel 25 and turn it, about an axis substantially perpendicular to frame 23, from the collapsed position shown in FIG. 5 into the lowered operating position shown in FIG. 4, wherein it engages a C-shaped fork 70 integral with rib 50 (FIG. 10). The lowered window 5 is then connected manually to plate 47 through opening 22. Assembly of door 1 is then completed by fitting on finished panels 51 and 60 and handle 58a.

Figure 11:
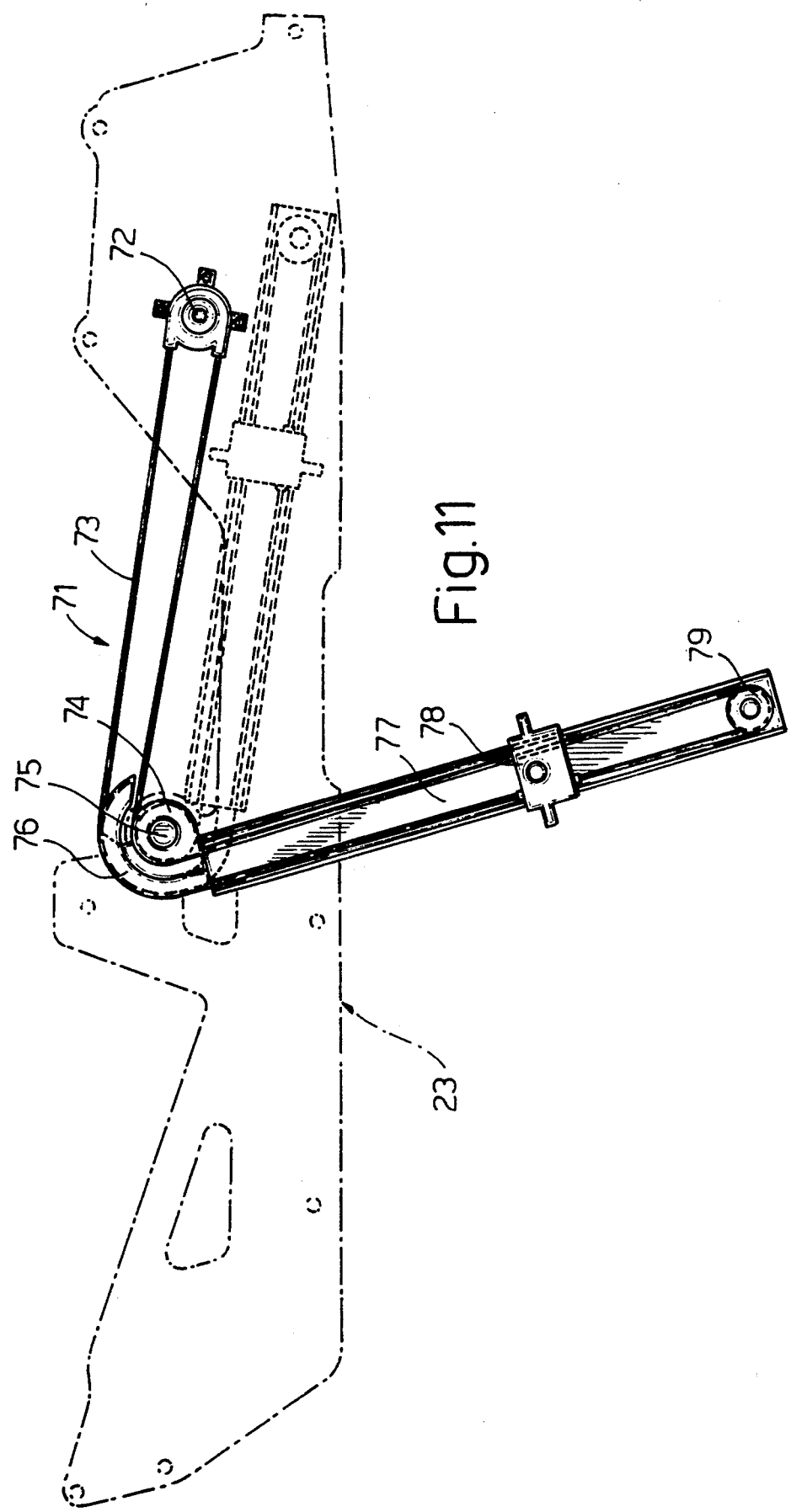
FIG. 11 shows a variation of the FIG. 4 detail, with parts removed for simplicity.

According to variation illustrated in FIG. 11, window regulating device 24 described above is replaced by a known cable-operated device 71 comprising a drum 72 operated by handle 58a and about which is wound a length of flexible cable 73. Device 71 also comprises a pulley 74 pivoting about point 75 on upright 32 of frame 23; and a sector 76 also pivoting about point 75 on upright 32 and fitted with a guide rod 77 in turn fitted in sliding manner with a plate 78 connected to window 5. Cable 73 is connected to plate 78 and looped about drum 72, pulley 74, sector 76 and a pulley 79 mounted on the opposite end of rod 77 to that connected to sector 76. As shown by the dotted line in FIG. 11, device 71, like device 24, is collapsible about pin 75 into an idle or assembly position wherein no part of device 71 projects outwards of opening 16.

I claim:

1. A vehicle door (1) having an upper window opening (6) fitted with a sliding window (5), and comprising, at the bottom, a box body (12) defined by an inner sheet (14) and an outer sheet (13) connected peripherally to each other; characterised by the fact that said inner sheet (14) presents an opening (16) extending over a relatively small upper portion of the same; a self-supporting frame (23) being connected in removable manner to said inner sheet (14) for closing said opening (16); a first finish panel (51) being connected to said inner sheet (14) for covering said frame (23); a second finish panel (60) being provided outside said box body (12) for covering said inner sheet (14); and door locking means (26, 27) and window regulating (24) and guide (25) means being connected to said frame (23).

2. A door as claimed in claim 1, characterised by the fact that said regulating (24) and guide (25) means comprise respective portions arranged, in use, in respective operating positions wherein said portions project below the bottom edge (19) of said opening (16); each said portion being connected to said frame (23) so as to move, in relation to said frame (23), between said projecting operating position and an assembled position wherein said portion is withdrawn and housed entirely within the perimeter of said opening (16).

3. A door as claimed in claim 2, characterised by the fact that first (65, 70) and second (66, 67) locking means are provided on said frame (23) for respectively maintaining said projecting portions in said operating and said assembly positions.

4. A door as claimed in claim 2, characterised by the fact that said window regulating and guide means respectively comprise a window regulating device (24)(71) and a guide channel (25); a portion of said channel (25) constituting one said projecting portion; and said window regulating device (24)(71) comprising guide means (45)(77) for a plate (47)(78) connected to said window (5); a portion of said guide means (45)(71) constituting a further said projecting portion.

5. A door as claimed in claim 4, characterised by the fact that said guide means (45)(77) and said channel (25) are connected to said frame (23) via respective hinge means (61, 69) so as to turn, in relation to said frame (23), between said operating and assembly positions and about respective axes substantially perpendicular to said frame (23).

6. A door as claimed in claim 1,
characterized by the fact that the surface (52) of said first panel (51) opposite the surface facing said frame (23) is so formed as to define an armrest (55).

7. A door as claimed in claim 1,
characterised by the fact that the surface (52) of said first panel (51) opposite the surface facing said frame (23) is so formed as to define a grip handle (57).

* * * * *